US012679292B2

(12) United States Patent (10) Patent No.: US 12,679,292 B2
Fuerstenberg et al. (45) Date of Patent: Jul. 14, 2026

(54) GROMMET FOR FEEDING A STRANDED ELEMENT THROUGH AN OPENING, FEEDTHROUGH ARRANGEMENT AND METHOD FOR FEEDING A STRANDED ELEMENT THROUGH AN OPENING

(71) Applicant: Airbus Operations GmbH, Hamburg (DE)

(72) Inventors: Malte Fuerstenberg, Hamburg (DE); Lauritz Petersen, Hamburg (DE); Björn Böhnke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 233 days.

(21) Appl. No.: 18/630,244

(22) Filed: Apr. 9, 2024

(65) Prior Publication Data

US 2024/0343213 A1 Oct. 17, 2024

(30) Foreign Application Priority Data

Apr. 11, 2023 (EP) ..................................... 23167269

(51) Int. Cl.
B60R 16/02 (2006.01)
(52) U.S. Cl.
CPC ................................ B60R 16/0222 (2013.01)
(58) Field of Classification Search
CPC .................................................. H02G 15/007
See application file for complete search history.

(56) References Cited

U.S. PATENT DOCUMENTS

| | | | |
|---|---|---|---|
| 5,639,993 A | 6/1997 | Ideno | |
| 6,010,134 A | 1/2000 | Katoh | |
| 2023/0020124 A1* | 1/2023 | Reich | ...................... F16F 7/108 |
| 2024/0194378 A1* | 6/2024 | Christy | ................... H02G 3/22 |

FOREIGN PATENT DOCUMENTS

EP 4112967 A1 1/2023

OTHER PUBLICATIONS

European Search Report for U.S. Appl. No. 23/167,269 dated Oct. 2, 2023.

* cited by examiner

*Primary Examiner* — Timothy J Thompson
*Assistant Examiner* — John B Freal
(74) *Attorney, Agent, or Firm* — KDW Firm PLLC

(57) ABSTRACT

A grommet for feeding a stranded element through an opening includes a first grommet element having an elongated first body with a first collar radially extended relative to the first body. The grommet includes a second grommet element having an elongated second body with a second collar radially extended relative to the second body. The first grommet element and the second grommet element are formed separately from each other. A feedthrough includes the grommet, and a method includes feeding a stranded element through an opening.

20 Claims, 4 Drawing Sheets

Fig. 3A          Fig. 3B

GROMMET FOR FEEDING A STRANDED ELEMENT THROUGH AN OPENING, FEEDTHROUGH ARRANGEMENT AND METHOD FOR FEEDING A STRANDED ELEMENT THROUGH AN OPENING

TECHNICAL FIELD

The disclosure herein relates to facilitating feeding of a stranded element through an opening, aperture, or the like. In particular, the disclosure herein relates to a grommet for feeding a stranded element through an opening. Further, the disclosure herein relates to a feedthrough arrangement comprising such grommet and a method for feeding a stranded element through an opening.

BACKGROUND

Stranded elements, such as a conduit, a cable, an electrical bundle, or the like, may be fed through an opening, such as a material opening, aperture, housing opening or aperture, or the like, by a grommet. Such a grommet may serve, for example, as a structural edge protection which is e.g. to prevent chafing, rubbing, or the like against an edge or the like of the opening, etc. Further, such a grommet needs to be installed together with the stranded element. Therefore, in case that the grommet is forgotten during installation or needs to be replaced in maintenance or the like the stranded element needs to be uninstalled. This is complex, time-consuming and/or costly. Hence, there may be a demand for an improved grommet.

SUMMARY

It is an object of the disclosure herein to provide a grommet that can be installed in a simple manner. This object is solved by the subject-matter disclosed herein.

According to a first aspect, the disclosure herein provides a grommet for feeding a stranded element through an opening. The grommet comprises a first grommet element comprising an elongated first body with a first collar radially extended relative to the first body. Further, the grommet comprises a second grommet element comprising an elongated second body with a second collar radially extended relative to the second body. The first grommet element and the second grommet element are formed separately from each other.

Due to the splitting or separation of the grommet, in particular splitting it into two parts, the grommet does not necessarily have to be installed together with the stranded element, but can be installed independently of the stranded element. Accordingly, the grommet can be installed and/or replaced without uninstalling the stranded element. Additionally, the grommet can be easily adapted to any design, dimension, etc. of the opening. The grommet may serve, for example, as a protection sleeve for the stranded element.

As used herein, the opening may be provided in any structure through which a string element is to be fed, passed, etc. The opening may also be referred to as an aperture, a material breakthrough, a feedthrough, or the like. For example, the structure having the opening may be a housing, tank, structural member, or the like. The opening may have an edge that is to be at least partially covered by the grommet to protect the stranded element, e.g., from chafing, rubbing, etc. The stranded element may be, for example, a conduit, e.g., a fluid conduit, an electrical conduit, etc., a cable, or the like.

The grommet may also be referred to as a protection sleeve, bushing, or the like. It may serve, for example, to protect the stranded element against rubbing or the like against the structure in the opening, aperture, feedthrough, etc. The grommet may be varied geometrically, e.g. in diameter, etc., for different openings, etc. The grommet may be made of a plastic material, e.g. a hard plastic, a rubber, etc., a metal, a material mix, or the like. The separate design of the grommet may be understood such that the first grommet element and the second grommet element are provided as separate parts. They may then be brought together and, if necessary, joined together. For example, they may be joined together directly or indirectly, i.e. via at least one further element. Each of the first grommet element and the second grommet element may form a partial circumference and/or radial part, e.g. half, of the grommet and together complement to the complete grommet. The respective collar may be understood to extend away from the respective elongated body in a direction transverse to the corresponding elongated extension, i.e. longitudinal axis. This transverse direction may, for example, be directed radially with respect to the elongated extension and/or longitudinal axis, so that the collar may radially extend the respective grommet element. The first grommet element and the second grommet element may each be configured to be oriented in mutually opposite directions along the elongated extension and/or longitudinal axis, when installed and/or during the intended use of the grommet. Each one of the first grommet element and the second element may form a respective half of the grommet.

The grommet may be used in, for example, vehicles, aircrafts, or the like, wherein other fields of application are conceivable. The grommet may be used where vibrations or the like may affect the stranded element. Likewise, the opening may be provided in a vehicle, aircraft, or the like, or any other field of application.

In at least some embodiments, the first body and the second body may be each configured to be brought together at one or more respective contact surfaces to complement each other circumferentially and/or radially to form the grommet. For example, the contact surfaces may be formed by respective end faces in the circumferential direction of the respective grommet element and/or the grommet. The one or more contact surfaces may define a fitting plane, joining plane, or the like of the first grommet element and second grommet element. This may allow the first grommet element and the second grommet element to be easily joined, fitted or at least brought together.

Alternatively or additionally, the first grommet element and the second grommet element may be configured to include a gap transverse to the elongated extension and/or longitudinal axis of the grommet, i.e. the first grommet element and the second grommet element. This allows the first grommet element and/or second grommet element to rest on the stranded element but not on each other. Further, the gap allows to compensate for tolerances in the thickness, e.g. diameter, of the stranded element.

In at least some embodiments, the first body and the second body may each comprise a cavity, which cavities complement each other when the first body and the second body are brought together in a direction transverse to their longitudinal extension direction, for receiving the stranded element. For example, one half of the cavity may be formed for the stranded element respectively.

In at least some embodiments, the first body and the second body may be arrangeable to contact each other transverse to their elongated extension with the first collar and the second collar facing away from each other. As mentioned above, the first grommet element and the second grommet element may each be configured to be oriented in mutually opposite directions along the elongated extension and/or longitudinal axis, when installed and/or during the intended use of the grommet. This allows the grommet to be installed independently of the stranded element, e.g. in advance, but also subsequently.

In at least some embodiments, the first body and the second body may be arrangeable offset relative to each other along their elongated extension and/or longitudinal axis. For example, a respective longitudinal end facing away from the collar of one of the first and second grommet element may project beyond the collar of the respective other grommet element when used or installed as intended. This facilitates installing of the grommet or grommet elements. It may also improve protection of the stranded element.

In at least some embodiments, the respective first collar and/or second collar may circumferentially project beyond a circumferential end of the respective first body and/or second body to circumferentially overlap with the other first body and/or second body. For example, the first collar and/or the second collar may extend more than, e.g., half, e.g., more than 180°, in the circumferential direction of the grommet and/or the respective grommet elements. The projecting collar may be formed symmetrically or asymmetrically. By way of further example, the collar thus projecting beyond the circumference of the respective body may overlap the body of the other grommet element in the circumferential direction when they are brought together. This may also be used as an indicator for incorrect installation, since if the grommet elements were installed in the same orientation, at least one circumferential sections of the collar, e.g. the respective projecting sections, would overlap or lie on top of each other in the elongated extension, i.e. the longitudinal axis, of the grommet.

In at least some embodiments, the other first body and/or second body may be guided inside the corresponding projecting part of the respective first collar and/or second collar along the elongated extension of the first body and/or the second body.

In at least some embodiments, the projecting parts or sections of the respective first collar and/or second collar may intersect along the elongated extension of the first body and second body. As mentioned above, this may be used as an indicator for incorrect installation.

In at least some embodiments, at least one of the first body and the second body may comprise a groove formed on a longitudinal side facing away from the respective collar, for attaching a tie. For example, the tie may be any tie, strap, or the like configured to lashing, tying, or the like the first grommet element and/or second grommet element with the stranded element. By way of further example, the tie may be used to tie the first grommet element and/or second grommet element together with the stranded element resting thereon, e.g. directly. For example, the tie may also be arranged and tightened only around the first grommet element and/or second grommet element having the groove and the stranded element.

In at least some embodiments, the tie may be arrangeable within the groove of one of the first body and the second body to intersect the collar of the other of the first body and the second body along the respective elongated extension of the first body and/or the second body. In other words, when tied around and/or with the stranded element, the respective tie may form a longitudinal stop for the collar of the other grommet element.

In at least some embodiments, the first grommet element and the second grommet element may be insertable into the opening from opposite directions, particularly from opposite axial directions. This simplifies the installation. It may also be easier to position the grommet as intended.

In at least some embodiments, the first grommet element and the second grommet element may be formed identically to each other. They may therefore be identical parts. Further, they may have identical part numbers. Further, they may be manufactured with the same tool using the same process.

In at least some embodiments, the grommet may be an additive manufacturing part. In other words, the grommet may be formed and/or manufacturing by additive manufacturing. Unlike previous grommets, which are manufactured using, for example, injection molding, additive manufacturing also makes it worthwhile to produce small quantities, such as those requested by the aerospace industry.

A second aspect provides a feedthrough arrangement. The feedthrough arrangement comprises an opening. Further, the feedthrough arrangement comprises a grommet according to the first aspect. The first grommet element and the second grommet element are inserted into the opening from opposite directions.

The opening may be provided in any structure through which the stranded element should be fed. The structure having the opening may have any thickness or strength, wherein the grommet's longitudinal extension may be selected according to that thickness or strength, or may be longer.

With respect to the possible embodiments of the grommet and/or the opening, reference is made to the above. Further, for the advantages of the feedthrough arrangement, reference is made to the first aspect.

A third aspect provides a method for feeding a stranded element through an opening. The method comprises feeding the stranded element through the opening. Further, the method comprises providing a grommet comprising two separate grommet elements in the opening around the stranded element such that a first grommet element is inserted from a first side and a second grommet element is inserted from a second side opposite to the first side.

The stranded element and the grommet may be installed independently of each other. They may be installed in any order, particularly due to the split design of the grommet.

With respect to the possible embodiments of the grommet and/or the opening, reference is made to the above. Further, for the advantages of the feedthrough arrangement, reference is made to the first aspect and/or second aspect.

It is noted that the embodiments described herein may be combined with any of the above aspects. Accordingly, the method may comprise any embodiment of the grommet, and vice versa. Likewise, the feedthrough arrangement described herein may comprise any embodiment of the grommet, and vice versa.

BRIEF DESCRIPTION OF THE DRAWINGS

The disclosure herein is explained in more detail below with reference to the embodiments shown in the schematic figures:

FIGS. 3A-3C illustrate in different views each an example grommet element;

In the figures of the drawings, elements, features and components which are identical, functionally identical and of identical action are denoted in each case by the same reference designations unless stated otherwise.

DETAILED DESCRIPTION

Figure 1:
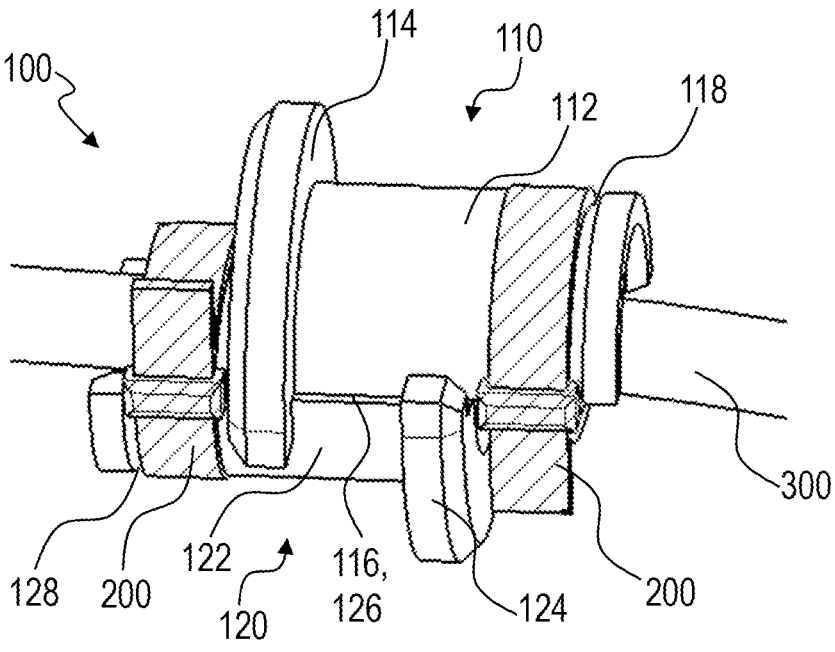
FIG. 1 illustrates an example grommet with an optional tie.

FIG. 1 illustrates an example grommet 100 for feeding a stranded element 300 through an opening (not shown). The grommet 100 comprises a first grommet element 110 comprising an elongated first body 112 with a first collar 114 radially extended relative to the first body 112. The first collar 114 is arranged in a direction along the elongated extension of the first body 112 at one longitudinal end, while the other longitudinal end does not have a collar, but is a free end. The grommet 100 further comprises a second grommet element 120 comprising an elongated second body 122 with a second collar 124 radially extended relative to the second body 122. Also, the second collar 124 is arranged in a direction along the elongated extension of the second body 122 at one longitudinal end, while the other longitudinal end does not have a collar, but is a free end. The first grommet element 110 and the second grommet element 120 are formed separately from each other.

For example, the first body 112 and the second body 122 are brought together at respective surfaces 116, 126, e.g. contact surfaces, to complement each other circumferentially and/or radially to form the grommet 100. Optionally, as indicated in FIG. 1, there may be a gap between the surfaces 116, 126 for at least partially compensating tolerances affected by the stranded element 300. The first body 112 and the second body 122 each comprise a cavity. The cavities complement each other when the first body 112 and the second body 122 are brought together in a direction transverse to their longitudinal extension direction, for receiving the stranded element 300. The first body 112 and the second body 122 are arranged to contact each other transverse to their elongated extension with the first collar 114 and the second collar 124 facing away from each other. The first body 112 and the second body 122 are arrangeable offset relative to each other along their elongated extension. The respective free end of the first grommet element 110 and the second grommet element 120 projects beyond the collar 114, 124 of the respective other one of the first grommet element 110 and the second grommet element 120.

Optionally, as indicated in FIG. 1, the respective first collar 114 and/or second collar 124 circumferentially projects beyond a circumferential end of the respective first body 112 and/or second body 122 to circumferentially overlap with the other first body 112 and/or second body 122. The other first body 112 and/or second body 122 is guided inside the corresponding projecting section of the respective first collar 114 and/or second collar 124 along the elongated extension of the first body 112 and/or the second body 122. The projecting sections of the respective first collar 114 and second collar 124 intersect along the elongated extension of the first body 112 and second body.

Optionally, as indicated in FIG. 1, at least one of the first body 112 and the second body 122 comprises a groove 118,

128 formed on a longitudinal side facing away from the respective collar 114, 124, for attaching a tie 200. FIG. 1 exemplarily illustrates two ties 200, each for each groove 118, 128. Here, each tie 200 ties the respective first body 112 or second body 122 and the stranded element 200. The respective tie 200 is arrangeable within the corresponding groove 118, 128 of one of the first body 112 and the second body 122 to intersect the collar 114, 124 of the other of the first body 112 and the second body 122 along the respective elongated extension of the first body 112 and/or the second body 122.

Optionally the first grommet element 110 and the second grommet element 120 are insertable into the opening from opposite directions, particularly from opposite axial directions along the elongated extension of the first body 112 and/or second body 122.

Optionally, the first grommet element 110 and the second grommet element 120 are formed identically to each other. So they may be manufactured with the same tool and/or process.

Optionally, the grommet 100 is an additive manufacturing part.

Figure 2:
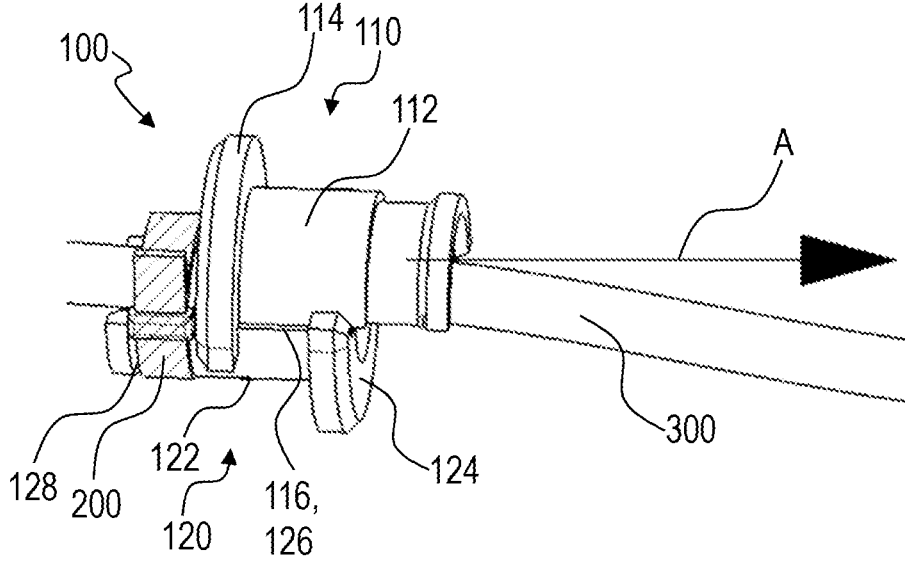
FIG. 2 illustrates an example grommet with an optional tie.

FIG. 2 illustrates the grommet 100 in a situation where one of the (optional) ties 200 is omitted, lost, or the like. In such case, however, particularly due to the above-mentioned (optional) intersection along the elongated extension of the first body 112 and/or the second body 122, moving the grommet 100 and/or the stranded element 300 is still not possible, for example, in direction of arrow A as indicated in FIG. 2. This may provide redundancy in case that one of the ties 200 is missing.

Figure 3C:
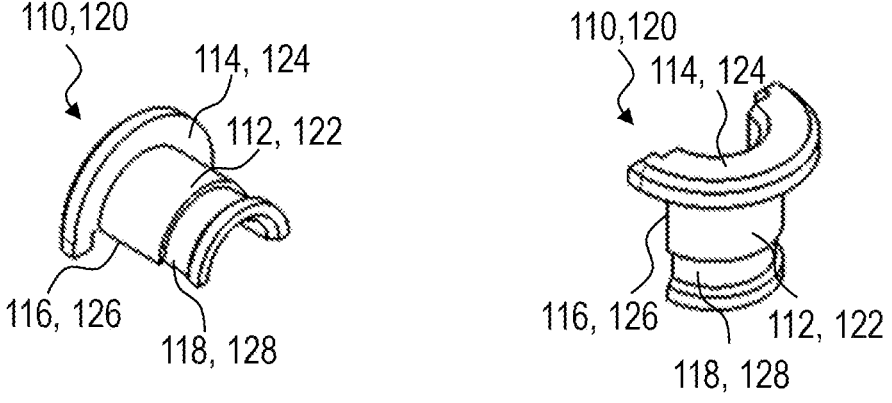
Figure 3C:
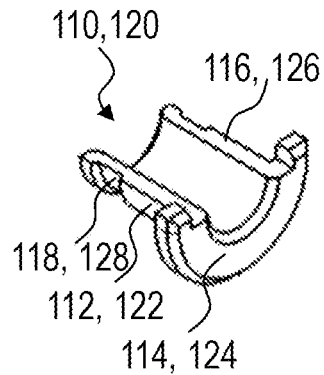

FIGS. 3A, 3B and 3C each illustrate the grommet elements 110 and/or 120 in different views. Here, some of the above-described elements, also optional elements, of the grommet 100 can be seen in more detail. For example, FIG. 3A further illustrates the groove 118, 128. FIG. 3B further illustrates that the collar 114, 124 may extend over more than 180° in the circumferential direction. FIG. 3C further illustrates the cavity for receiving the stranded element 300.

Figure 4:
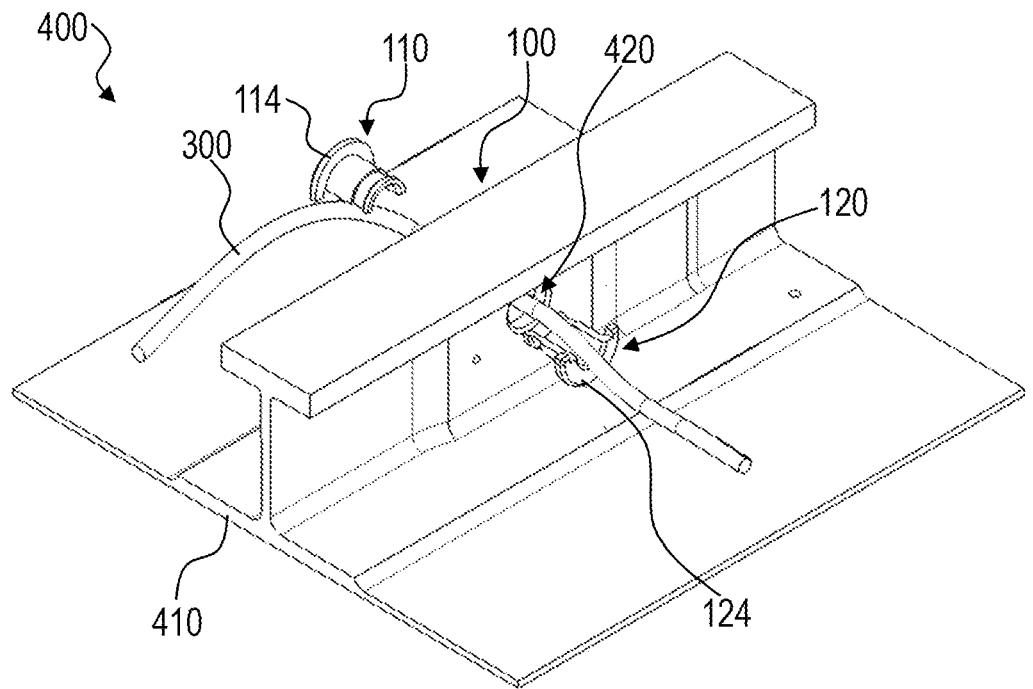
FIG. 4 illustrates in a perspective view an example feedthrough having an opening and an example grommet before or during installation.

FIG. 4 illustrates an example feedthrough arrangement 400 to which the grommet 100 may be applied to. The feedthrough 400 comprises a structure 410, which may include, for example, a structural member, a housing, a tank, or the like. The structure comprises an opening 420, which may also be referred to as aperture or the like. The feedthrough arrangement 400, particularly the opening 420, may be configured to feed the stranded element 300 therethrough. The first grommet element 110 and the second grommet element 120 may be inserted into the opening 420 independently from the stranded element 300, either before or after feeding the same through the opening 420. The first grommet element 110 and the second grommet element 120 may be inserted into the opening 420 from opposite axial directions with respect to the longitudinal extension of the stranded element 300 and/or the longitudinal axis of the opening 420. The respective collars 114, 124 may be oriented in mutually different radial directions.

Figure 5:
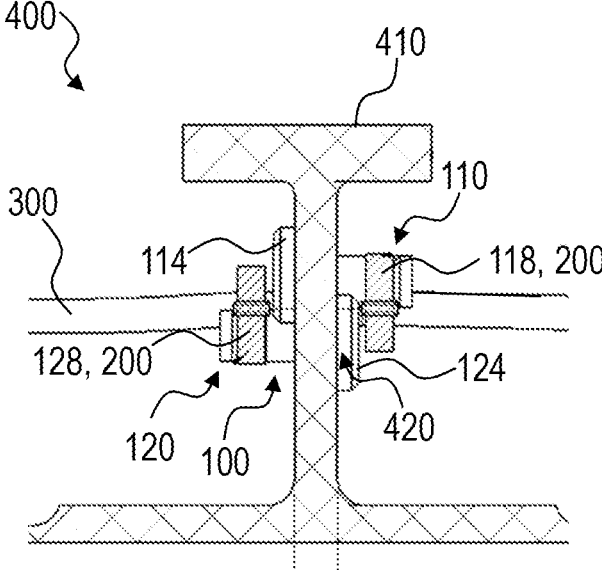
FIG. 5 illustrates in a sectional view an example feedthrough having an opening and an example grommet.

FIG. 5 shows the example feedthrough arrangement 400 in a sectional view. It can be seen that the first grommet element 110 is inserted from a first side, in FIG. 5 exemplarily from the left, and the second grommet element 120 is inserted from a second side opposite to the first side, which in FIG. 5 is exemplarily from the right, along the longitudinal axis of the stranded element 300 and/or the opening 420. Further, FIG. 5 illustrates that one of the ties 200 shown, arranged in the groove 128 of the second grommet element 120 as well as tied around the second grommet element 120 and the stranded element 300, intersects the collar 114 of the first grommet element 110, along the longitudinal axis of the stranded element 300 and/or the opening 420. Likewise, the other one of the ties 200 shown, arranged in the groove 118 of the first grommet element 110 as well as tied around the first grommet element 110 and the stranded element 300, intersects the collar 124 of the second grommet element 110, along the longitudinal axis of the stranded element 300 and/or the opening 420. The respective tie 200 is fixed along the longitudinal axis of the stranded element 300 and/or the opening 420 by the respective groove 118, 128 and/or the respective collar 114, 124.

Figure 6:
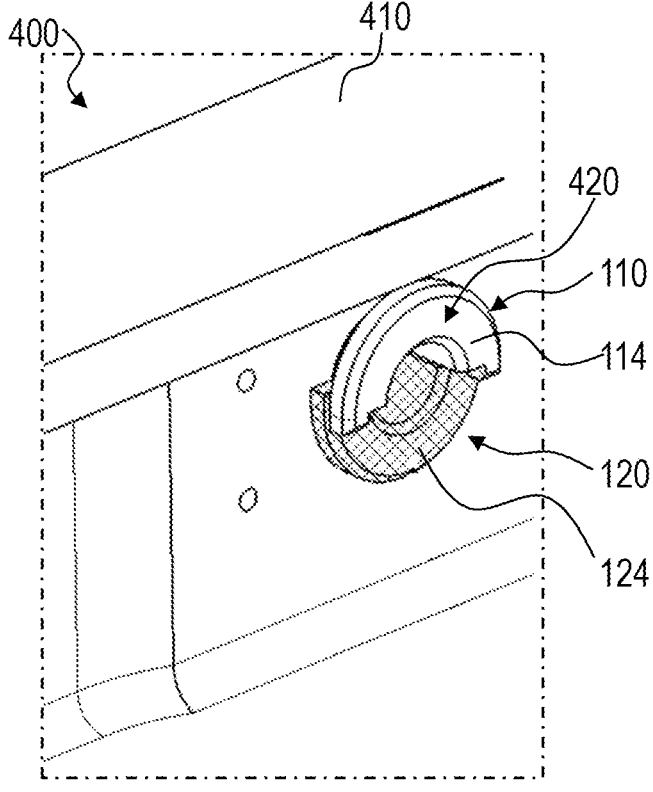
FIG. 6 illustrates an example illustrates in a sectional view an example feedthrough having an opening and an example grommet being incorrectly installed.

FIG. 6 illustrates how incorrect installation of the grommet 100 may be indicated due to its design. Again, the grommet 100 is installed in the opening 410 of the example feedthrough 400. In FIG. 6, the first grommet element 110 and the second grommet element 120 are inserted into the opening 420 from the same side along the longitudinal axis thereof in an indeterminate manner. As can be seen, the collars 114, 124 of the first grommet element 110 and the second grommet element 120 do not complement each other circumferentially and/or radially but overlap each other section-wise along the longitudinal axis of the opening 420. Accordingly, one of the collars 114, 124, here the collar 114 of the first grommet element 110, thus does not directly contact the structure 410, but incorrectly contacts the collar 124 of the second grommet element 120. This is due to the projecting section of the respective collar 114, 124, extending over more than 180°.

Referring now to FIG. 4 and FIG. 5, a method for feeding a stranded element through an opening will be described. For example, the stranded element 300 is to be fed through the opening 410, and protected by the grommet 100. For this, the method comprises feeding the stranded element 300 through the opening 410. Further, the method comprises providing the grommet 100 comprising the two separate grommet elements 110, 120 in the opening 420 around the stranded element 300 such that the first grommet element 110 is inserted from a first side and the second grommet element 120 is inserted from a second side opposite to the first side, along the longitudinal axis of the stranded element 300 and/or the opening 420. Optionally, the stranded element 300 and/or one or both of the grommet elements 110, 120 may be feed through and/or inserted into the opening 420 first. Optionally, at least one or each of the first grommet element 110 and the second grommet element 120 may be tied together with the stranded element 300 using a respective tie 200. The respective tie 200 may be arranged in the (optional) respective groove 118, 128 of the first grommet element 110 and/or the second grommet element 120. The respective tie 200 may reduce or avoid a relative movement between the respective first and/or second grommet element 110, 120 and the stranded element 300.

If some aspects have been described in relation to the grommet, these aspects should also be understood as a description of the corresponding method. For example, a feature of the grommet or functional aspect of it may correspond to a feature, such as a method step, of the corresponding method. Accordingly, aspects described in relation to a method shall also be understood as a description of the corresponding element, a property or a functional feature of the corresponding grommet.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

100 grommet
110 (first) grommet element
112 (first) body
114 (first) collar
116 (first) surface(s)
118 (first) groove
120 (second) grommet element
122 (second) body
124 (second) collar
126 (second) surface(s)
128 (second) groove
200 tie(s)
300 stranded element
400 feedthrough arrangement
410 structure
420 opening
A direction of movement

The invention claimed is:

1. A grommet for feeding a stranded element through an opening, the grommet comprising:
   a first grommet element comprising an elongated first body with a first collar radially extended relative to the first body; and
   a second grommet element comprising an elongated second body with a second collar radially extended relative to the second body;
   wherein the first grommet element and the second grommet element are formed separately from each other; and
   wherein:
      the first collar circumferentially projects beyond a circumferential end of the first body to circumferentially overlap with the second body; and/or
      the second collar circumferentially projects beyond a circumferential end of the second body to circumferentially overlap with the first body.

2. The grommet of claim 1, wherein the first body and the second body are each configured to be brought together at respective contact surfaces to complement each other circumferentially and/or radially to form the grommet.

3. The grommet of claim 1, wherein the first body comprises a first cavity and the second body comprises a second cavity, the first and second cavities complementing each other when the first body and the second body are brought together in a direction transverse to an elongation direction, for receiving the stranded element.

4. The grommet of claim 1, wherein the first body and the second body are arrangeable to contact each other transverse to their an elongation direction, with the first collar and the second collar facing away from each other.

5. The grommet of claim 1, wherein the first body and the second body are arrangeable offset relative to each other along an elongation direction.

6. The grommet of claim 1, wherein:
   when the first collar circumferentially projects beyond the circumferential end of the first body to circumferentially overlap with the second body, the second body is guided inside a corresponding projecting section of the first collar along the first body; and/or when the second collar circumferentially projects beyond the circumferential end of the second body to circumferentially overlap with the first body, the first body is guided inside a corresponding projecting section of the second collar along the second body.

7. The grommet of claim 6, wherein:

the corresponding projecting section of the first collar and the corresponding projecting section of the second collar intersect along the first body and the second body.

8. The grommet of claim 1, wherein:

the first body comprises a first groove formed on an opposite end of the first body from the first collar; and/or the second body comprises a second groove formed on an opposite end of the second body from the second collar; and wherein the first collar and the second collar are each configured for attaching a tie.

9. The grommet of claim 8, wherein:

when the tie is arranged within the first groove, the tie is configured to intersect the second collar; and/or when the tie is arranged within the second groove, the tie is configured to intersect the first collar.

10. The grommet of claim 1, wherein:

the first grommet element and the second grommet element are insertable into the opening from opposite directions, or from opposite axial directions;

the first grommet element and the second grommet element are formed identically to each other; and/or the grommet is an additive manufacturing part.

11. A feedthrough arrangement, comprising:

an opening; and the grommet according to claim 1;

wherein the first grommet element and the second grommet element are inserted into the opening from opposite directions.

12. A method for feeding a stranded element through an opening, the method comprising:

feeding the stranded element through the opening;

providing the grommet according to claim 1;

inserting the first grommet element into the opening and around the stranded element from a first side; and inserting the second grommet element into the opening and around the stranded element from a second side, which is opposite the first side.

13. A grommet for feeding a stranded element through an opening, the grommet comprising:

a first grommet element comprising an elongated first body with a first collar radially extended relative to the first body; and a second grommet element comprising an elongated second body with a second collar radially extended relative to the second body;

wherein the first grommet element and the second grommet element are formed separately from each other;

wherein:

the first body comprises a first groove formed on an opposite end of the first body from the first collar, the first groove being configured for attaching a tie that is arrangeable within the first groove of the first body to intersect the second collar of the second grommet element; and/or the second body comprises a groove formed on an opposite end of the second body from the second collar, the second groove being configured for attaching a tie that is arrangeable within the second groove of the second body to intersect the first collar of the first grommet element.

14. The grommet of claim 13, wherein:

the first body and the second body are each configured to be brought together at respective contact surfaces to complement each other circumferentially and/or radially to form the grommet;

the first body comprises a first cavity and the second body comprises a second cavity, the first and second cavities complementing each other when the first body and the second body are brought together in a direction transverse to an elongation direction, for receiving the stranded element;

the first body and the second body are arrangeable to contact each other transverse to the elongation direction, with the first collar and the second collar facing away from each other;

the first body and the second body are arrangeable offset relative to each other along the elongation direction;

the first grommet element and the second grommet element are formed identically to each other; and/or the grommet is an additive manufacturing part.

15. A feedthrough arrangement, comprising:

an opening; and the grommet according to claim 13;

wherein the first grommet element and the second grommet element are inserted into the opening from opposite directions.

16. A method for feeding a stranded element through an opening, the method comprising:

feeding the stranded element through the opening;

providing the grommet according to claim 13;

inserting the first grommet element into the opening and around the stranded element from a first side; and inserting the second grommet element into the opening and around the stranded element from a second side, which is opposite the first side.

17. A grommet for feeding a stranded element through an opening, the grommet comprising:

a first grommet element comprising an elongated first body with a first collar radially extended relative to the first body; and a second grommet element comprising an elongated second body with a second collar radially extended relative to the second body;

wherein the first grommet element and the second grommet element are formed separately from each other; and wherein the first grommet element and the second grommet element are only configured for insertion into the opening from opposite axial directions.

18. The grommet of claim 17, wherein:

the first body and the second body are each configured to be brought together at respective contact surfaces to complement each other circumferentially and/or radially to form the grommet;

the first body comprises a first cavity and the second body comprises a second cavity, the first and second cavities complementing each other when the first body and the second body are brought together in a direction transverse to an elongation direction of the first body and the second body, for receiving the stranded element;

the first body and the second body are arrangeable to contact each other transverse to the elongation direction, with the first collar and the second collar facing away from each other;

the first body and the second body are arrangeable offset relative to each other along the elongation direction;

the first grommet element and the second grommet element are formed identically to each other; and/or the grommet is an additive manufacturing part.

19. A feedthrough arrangement, comprising:

an opening; and the grommet according to claim 17;

wherein the first grommet element and the second grommet element are inserted into the opening from opposite directions.

20. A method for feeding a stranded element through an opening, the method comprising:

feeding the stranded element through the opening;

providing the grommet according to claim 17;

inserting the first grommet element into the opening and around the stranded element from a first side; and inserting the second grommet element into the opening and around the stranded element from a second side, which is opposite the first side.

* * * * *